June 12, 1951          P. PANHARD          2,556,630
SUSPENSION FOR MOTOR CARS AND THE LIKE
Filed June 28, 1945          2 Sheets-Sheet 1
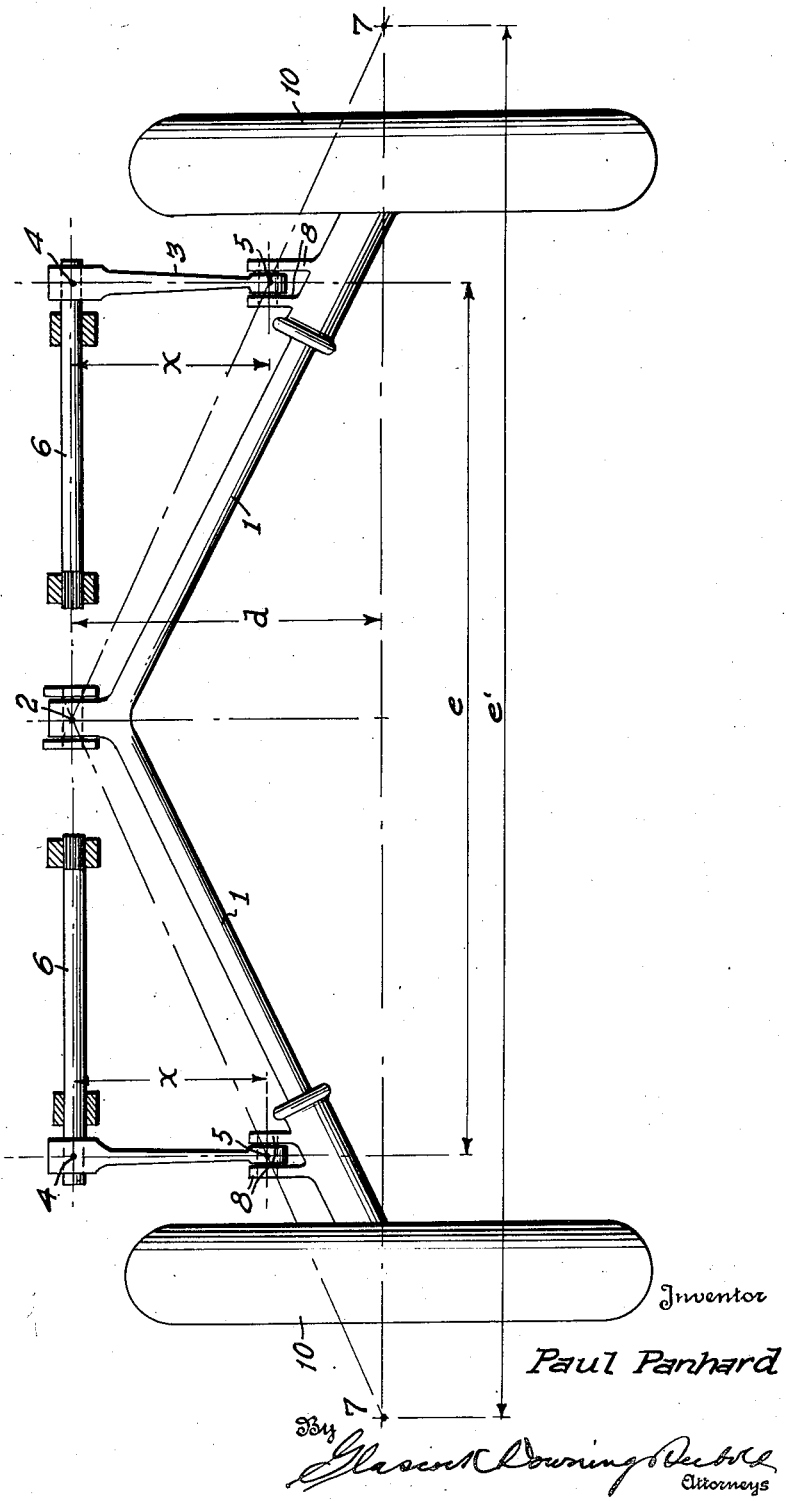
Inventor
Paul Panhard
By *Glascock Downing & Seebold*
Attorneys June 12, 1951 P. PANHARD 2,556,630
SUSPENSION FOR MOTOR CARS AND THE LIKE
Filed June 28, 1945 2 Sheets-Sheet 2
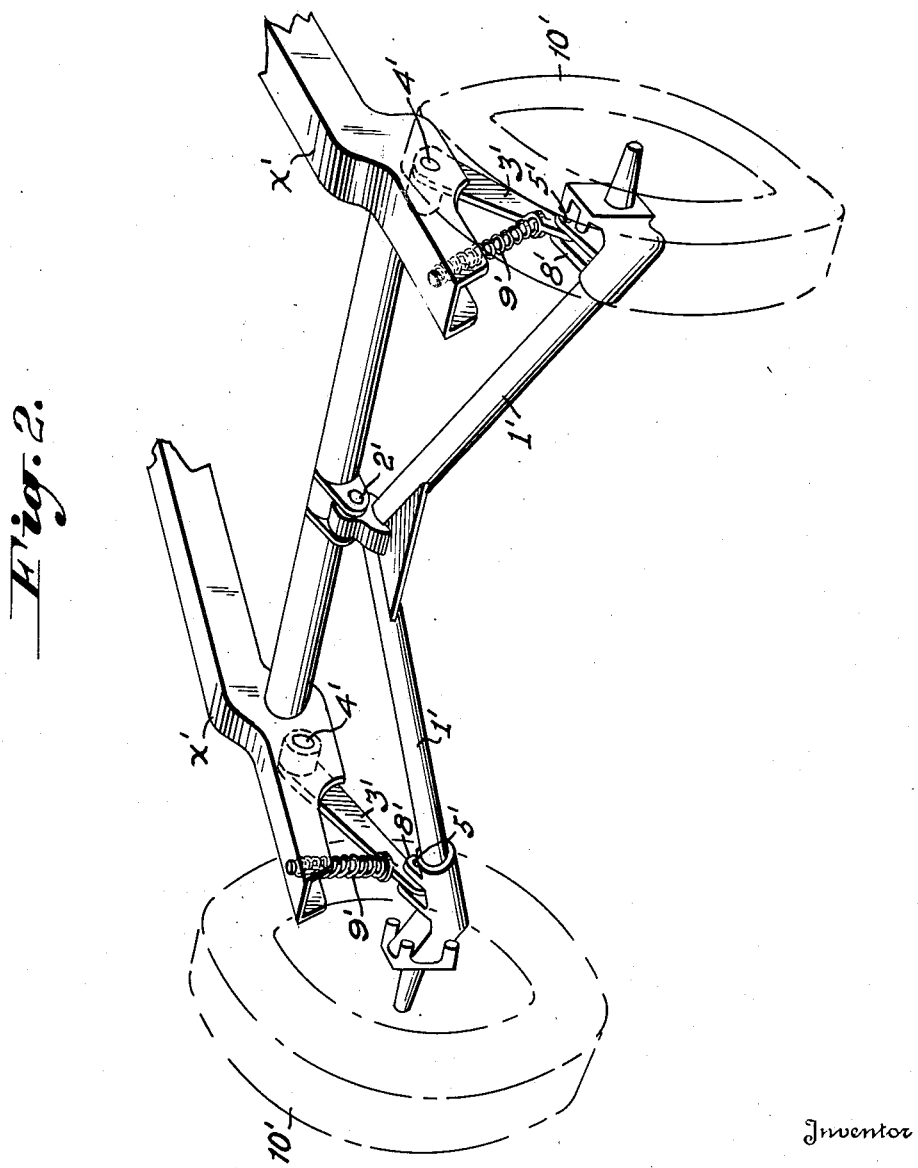
Inventor
Paul Panhard
Attorneys Patented June 12, 1951

2,556,630

UNITED STATES PATENT OFFICE 2,556,630

SUSPENSION FOR MOTOR CARS AND THE LIKE

Paul Panhard, Paris, France, assignor to Société Anonyme des Anciens Etablissements Panhard & Levassor, Paris, France Application June 28, 1945, Serial No. 602,005
In France April 17, 1944

Section 1, Public Law 690, August 8, 1946
Patent expires April 17, 1964

3 Claims. (Cl. 280—124)

The present invention relates to a stabilizing suspension for motor cars and the like. More particularly the invention relates to a suspension system for front wheel drive vehicles which necessarily embodies a rear axle structure different from that utilized in conventional rear end driven vehicles.

French Patent No. 805,307, dated August 6, 1935, illustrates a suspension for a motor vehicle in which the rear axle is the driving axle and is connected to the frame of the vehicle by a reaction arm articulated on said frame by means of a ball and socket. The arrangement of this patent comprises on each side of the longitudinal axis of the vehicle a resilient suspension device, one arm of which bears against the lower face of the longitudinal side frame member of the vehicle. The structural arrangement of the French patent assists in the stabilization of the vehicle.

Accordingly it is an object of the present invention to provide a stabilized suspension for a motor vehicle in which the rear axle does not constitute a driven axle.

It is a further object to provide a suspension system including a rigid V-shaped axle mounted with the apex of the V disposed substantially in the longitudinal axis of the vehicle and inwardly of the wheels carried by the axle and which axle is mounted to the frame or body by a connection providing universal movement of the axle relative to the frame and between the frame or body of the vehicle and the axle and on opposite sides of the longitudinal axis of the vehicle are provided arms or rods pivotally mounted about at least a horizontal axis on the axle and pivotally mounted about a horizontal axis to the frame or body and in which resilient means are provided that normally urge the arms away from the frame. It is a further object to provide in a suspension system of the structure hereinafter set forth, a particular orientation of the pivotal connection between the arms and the axle whereby by varying the position of the pivotal connection in a line parallel to the longitudinal axis of the vehicle, the stabilization characteristics of the suspension system can be modified.

The invention will now be described with reference to the accompanying drawings in which Figure 1 is a diagrammatic view ilustrating the rear axle in plan; and Figure 2 is a perspective view of a modification of the invention.

In the drawing the rear axle 1 is rigid and V- shaped and is disposed between the vehicle with the apex of the V substantially in the longitudinal vertical plane of symmetry of the vehicle and inward of the wheel axis. The wheels 10 are of course carried by the outer ends of the axle and at 2 is denoted the center of a connection that provides for universal movement of the axle relative to the frame or body of the vehicle about the longitudinal axis of the vehicle and the transverse axis of the vehicle extending through the point 2. On opposite sides of the longitudinal axis of the vehicle and equidistant therefrom are provided spaced paralled arms or rods 3 which at one end are pivoted about centers 4—4 relative to the vehicle body or frame. In this connection the centers of these pivot joints and the center of the universal connection 2 are all located on the same transverse horizontal axis. Each leg or branch of the V-shaped axle is provided with an extension 8 projecting outwardly of the axle and in a direction parallel with the longitudinal axis of the vehicle and perpendicular to the horizontal axis containing the points 4, 2, 4. The opposite end of each of the arms 3 is pivotally connected to these extensions 8 for pivotal movement about a horizontal axis parallel to the wheel axis and the horizontal axis containing the points 4, 2, 4. It will be noted that in the drawing the extension 8 is indicated as spaced parallel arms or lugs that extend inwardly of the axle. The particular structure of this extension is unimportant so long as it provides means to accommodate pivotal connection about a horizontal axis at the point 5 to the arms or rods 3. This arrangement with the extension on the inner side of the axle permits of varying the stabilization characteristics by moving the horizontal axis through the point 5 toward or away from points 4 in a straight line. In other words, by making the extension longer or shorter the connection between the arms 3 and 5 is displaced thereby varying the flexibility of the system.

The resilient means bearing under the frame or chassis and urging each of the arms away from the frame or chassis may be constituted by one or more spiral springs bearing against the rods or as indicated one or more torsional bars 6 extending along the axis 4, 2, 4, and on each side of the joint 2, connected rigidly at one end to the body or frame of the vehicle and at the other end to the arms 3. The drawing illustrates one torsion bar on each side of the joint 2 which in this instance has its axis along the horizontal axis 4, 2, 4.

As indicated in Figure 2, in a modified form showing coiled or spiral springs as resilient means the rods 3' are pivotally connected about centers 4' to the frame X' and to their opposite ends to the extensions 8' the center of which connection is denoted by reference 5'. The apex of the axle 1' is connected to the frame for pivoting movement about a longitudinal axis of the vehicle and about a transverse axis containing the center points 4', 2', 4'. The wheels 10' are of course carried by the outer ends of the axle legs and the resilient means constitutes the springs 9' operative between the side bars of the frame and the rods 3' to urge the rods away from the frame.

It is therefore clear that with the arrangement according to the invention each wheel is connected to the vehicle by means of the rod 3 and the adjacent half axle section thereby providing a triangulated system. The position of each wheel is thus firmly secured in relation to the vehicle body.

The suspension system of the invention can be compared to a theoretical suspension system of ideal characteristics constituted by spaced vertically extending springs bearing on the axis of spaced wheels disposed the same distance apart as the wheels of the present invention. In this system if the two wheels rise together these vertical springs are raised together by the same amount, $h$ mm. However the suspension bearing points 5 only rise by an amount $$\frac{hx}{d}$$

$x$ and $d$, as indicated on the drawing being the respective distances separating the axis of rotation 4, 2, 4 from the wheel axis and from the axis through the bearing point 5. It is thus seen that if $f$ designates the flexibility of the springs in the case of the present invention in mm. per 100 kgs., an equivalent theoretical ideal suspension system must be provided with springs of a flexibility $$f\left(\frac{d}{x}\right)^2 \text{ mm.}$$

per 100 kgs., since a force of 100 kgs. on the wheels produces $$100\frac{d}{x} \text{ kgs.}$$

on the springs lowering them by $$f\frac{d}{x} \text{ mm.}$$

and the wheels move by an amount $$f\frac{d}{x}\cdot\frac{d}{x} = f\left(\frac{d}{x}\right)^2 \text{ mm.}$$

If now, instead of both wheels rising at the same time, one is raised and the other lowered by the same amount, a movement of rotation about the longitudinal axis passing through the connection 2 is produced, which corresponds to the relative movement of the axle with respect to the car body in a road turn for example. The springs according to the invention and the springs of the theoretical system in discussion, in this case, move through the same distance, whatever be the value of $x$. However, the restoring force is an inverse function of the flexibilities, as well as the restoring moment, since the springs are at the same distance apart as mm.

These moments have a value $$100\frac{h}{f}e \text{ kg. mm.}$$

in the case of the invention and $$\frac{100}{\left(\frac{1}{2}\right)^2}\cdot\frac{h}{f}\cdot e \text{ kg. mm.}$$

in the case of the springs of the theoretical system. It is therefore clear that the latter springs, assuming that they retain their flexibility, should be at a distance $$e\frac{d}{x} \text{ mm.}$$

apart, in order to produce the same restoring moment as in the case of the invention, inasmuch as the force, for this greater distance would become $$100\cdot\frac{h}{f\left(\frac{d}{x}\right)^2}\cdot\frac{d}{x} \text{ kg.}$$

and the length of the arm would be:

$$e\cdot\frac{d}{x} \text{ mm.}$$

For a same suspension value, this is equivalent to mounting the springs of the example at the points 7, 7 where the axis of the wheels meets the lines 2,5 and 2,5 passing through the joint 2 of the axle and the suspension bearing points 5.

Taking the above considerations as a basis, the flexibility and the stabilizing power of a suspension according to the invention can be defined by comparison with those of a theoretical suspension of given flexibility and of given distance $e'$ between the springs, that is, defined by springs of given flexibility mounted at 7, 7 on the wheel axis. Any suspension according to the invention, the suspension bearing point 5 of which is situated on the line 2,7 and the spring of which has a flexibility $$f\cdot\left(\frac{x}{d}\right)^2$$

is the equivalent of such a theoretical suspension. It is thus seen that the arrangement according to the invention, whilst retaining the flexibility of a theoretically ideal suspension, ensures a stability which the latter could not give since it would be necessary to mount the springs outside the wheels.

What I claim as my invention and desire to secure by Letters Patent is:

1. A stabilizing suspension for a vehicle including a frame comprising a rigid V-shaped axle having its apex inward of the wheel axis and substantially in the longitudinal vertical plane of symmetry of the vehicle, a universal connection between the apex of the axle and the frame providing for movement of the axle about horizontal and longitudinal axes relative to the frame, a wheel carried by each end of the axle, and extension on each leg of the axle inward of the wheels and extending parallel with the longitudinal axis of the vehicle and on the side of the axle opposite to the side adjacent the wheel axis, a pair of spaced parallel rods each connected at one end to the frame for movement about a horizontal axis extending transversely of the vehicle and through the connection between the axle and the frame, said rods being parallel with the longitudinal axis of the vehicle bisecting the apex of the axle and equidistant therefrom, the opposite ends of each rod being each connected to one of said extensions for pivotal movement about a horizontal axis parallel to the horizontal axis of pivotation of the opposite ends of the rods and parallel to the wheel axis, resilient means connected to the rods and the frame and urging the rods away from the frame and the pivot connection betwen the rods and the extensions being spaced from the axis of the axle legs and positioned such that a line passing through the center point of the connection between the axle and the frame and the horizontal pivot connection between the rods and the extensions intersects the wheel axis outwardly of the plane of the wheel.

2. A stabilizing suspension as defined in and by claim 1 in which the resilient means comprise spiral springs bearing on the rods.

3. A stabilizing suspension as defined in and by claim 1 in which the resilient means comprise torsion bars connected between the frame and the rods and extending transversely of the vehicle and on opposite sides of the connection between the axle and the frame.

P. PANHARD.

REFERENCES CITED

The following references are of record in the file of this patent:

UNITED STATES PATENTS

| Number | Name | Date |
| --- | --- | --- |
| 2,083,085 | Palmer | June 8, 1937 |

FOREIGN PATENTS

| Number | Country | Date |
| --- | --- | --- |
| 810,570 | France | Mar. 24, 1937 |